(No Model.)
C. WILLMS.
ELECTRIC BATTERY.
No. 554,760. Patented Feb. 18, 1896.
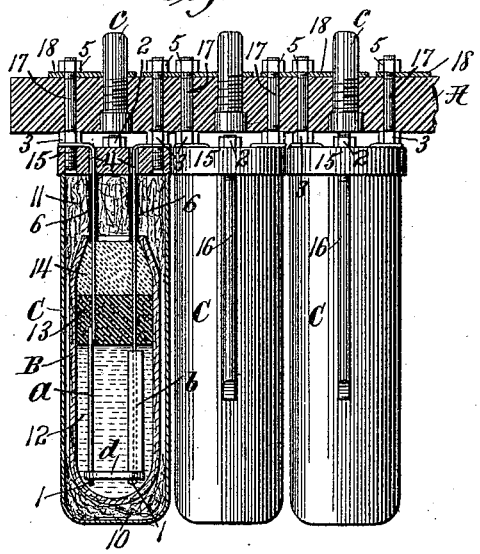
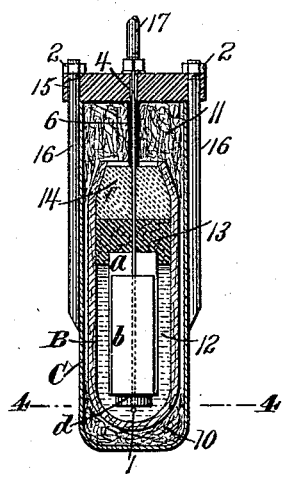
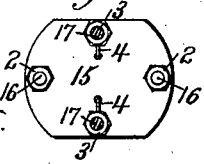
Attest:
Geo. H. Botts.
C. J. Sawyer
Inventor
Charles Willms
by Philipp Mauro & Phelps
Attys

UNITED STATES PATENT OFFICE.

CHARLES WILLMS, OF BALTIMORE, MARYLAND.

ELECTRIC BATTERY.

SPECIFICATION forming part of Letters Patent No. 554,760, dated February 18, 1896.

Application filed January 19, 1894. Serial No. 497,402. (No model.)

*To all whom it may concern:*

Be it known that I, CHARLES WILLMS, a citizen of the United States, residing at Baltimore city, in the State of Maryland, have invented certain new and useful Improvements in Electric Batteries, fully described and represented in the following specification and the accompanying drawings, forming a part of the same.

The object of the present invention is to provide an improved battery of that class known as "dry-cell batteries," consisting of a number of small dry cells, and especially to provide an improved construction of the individual cells and the means by which they are secured in the cell-support of the battery. As the life of the small dry cells used in such batteries is necessarily limited and the battery must be quite frequently renewed by substitution of new cells for the old, it is desirable that the cells be secured to the support in such a manner as to be readily placed in position and removed, so as to secure the proper connections with certainty, without the return of the battery to the factory or special skill on the part of the operative.

In another application, Serial No. 472,867, dated May 3, 1893, I have described and claimed a construction in which the cells are provided with enlarged supporting-terminals, these terminals being secured to the cell-support of the battery by removable devices of such construction that the cells are held firmly in position and at the same time may readily be removed and new cells substituted therefor.

The present invention includes certain improvements in cells provided with such supporting-terminals, intended especially to increase the efficiency and lessen the cost of manufacture of the cells, certain of these improvements, however, being applicable also to cells not provided with such terminals.

For a full understanding of the invention a detailed description will now be given of a construction embodying the same in the preferred form, reference being had to the accompanying drawings, forming a part of this specification.

Figure 1 is a vertical sectional view of a portion of the cell-support, showing three cells supported thereby, one of the cells being shown in section. Fig. 2 is a central section of one of the cells, taken at right angles to Fig. 1. Fig. 3 is a top plan view of one of the cells. Fig. 4 is a section on the line 4 of Fig. 2, looking upward.

Referring to the drawings, A is the cell-support, and B the cells supported therein, the cell-support consisting in the form shown of a plate of non-conducting material in which the cells are secured so as to be inserted in and removed from the cell-case with the support, as usual in such constructions.

The cells B are common glass dry cells, and preferably the chloride-of-silver dry cell, now well known and fully described in many prior Letters Patent—*e. g.*, No. 450,840, No. 479,541, No. 437,469, No. 421,801, No. 414,627, No. 403,451, No. 374,863, and No. 374,862—the construction being varied in accordance with the present invention.

Each of the glass cells B is inserted within a cell-case C, which is preferably of metal, but may be of hard rubber or other suitable material, preferably resting upon cotton 10 or similar absorbent material at the bottom of the case and being shorter than the case so as to leave a space above the cell to receive the battery-fluid in case of breakage or leakage of the cell, and which is preferably filled with similar absorbent material 11 to take up this fluid.

The cell B contains the battery-fluid 12, in which are the two elements $a\ b$, the cell being closed above the fluid by a body of plastic material 13 and outside this by a plug 14 of plaster-of-paris or similar material inserted in a plastic state and which forms a tight joint on setting.

In the construction shown each of the elements $a\ b$ is provided at its lower end with an extension or stud 1, that of element $b$ being formed by extending the terminal wire through the element, which extensions pass through holes in a separating-plate $d$, so that the lower ends of the elements are thus held at a fixed distance apart, the separating-plate $d$ being formed of any suitable conducting material, preferably vulcanized fiber. This feature, however, may be omitted and in itself forms no part of the present invention, but it is described and claimed in another application, Serial No. 517,361, filed July 12, 1894.

Referring now to the parts by which the cell is supported and the cell connections made, the cell-case C containing the cell is covered by a cap 15 of suitable non-conducting material, preferably vulcanized fiber, which is preferably secured thereon by screw-rods 16, soldered or otherwise secured to or formed on the outside of the case and passing through holes in the cap 15, with nuts 2 outside the cap, by which means the cap may be forced down hard upon the metal case so as to close it tightly. Two of these screw-rods are shown; but it will be understood that this number may be varied, if desired, and that the cap may be secured by other means than these screw-rods.

The cell is supported in the support A by two screw-rods 17, carried by the cap 15 and preferably screwed into the cap at opposite sides, as shown, these rods preferably having thereon nuts 3, as shown, by which close contact is made with the terminals 4, which consist of the usual wires connected to the respective elements $a$ $b$ and passing through the plugs 13 14 to the outside of the cell, where they are twisted about the rods 17. The rods 17 thus form extended and enlarged supporting-terminals, these rods 17 passing through holes in the cell-support and being secured thereon by removable devices, preferably consisting of nuts 5 on the screw-threaded upper ends of the rods, which nuts screw down upon and make contact with conducting-plates 18, by which connection is made between the enlarged terminals 17 and the battery-connectors $c$.

Soft-rubber sleeves 6 are preferably put upon the wires 4 before they are passed through the cap 15, these sleeves thus covering the wires between the cap and the top of the cell. These rubber sleeves aid in preventing possible short-circuiting, especially by the absorption of moisture by the absorbent material. These sleeves also may be used to close the openings through the cap 15, so as to prevent the escape of the battery-fluid through these openings in case of breakage or leakage; but this may not be found necessary, especially when absorbent material is used, as shown. The wire 4 is shown soldered onto terminal $a$ within the plastic material 13, and this is desirable to prevent possibility of short-circuiting with the solder; but this feature forms no part of the present invention, being fully described and claimed in my application, Serial No. 517,361, filed July 12, 1894, above referred to.

It will be seen that a very simple, clean, and efficient construction of cell is thus provided, which may be handled without danger of breakage and may readily be inserted in and removed from the cell-support without skill. The cap 15 closes the cell-case tightly, and the battery-fluid is taken up within the case if the cell breaks or leaks, so that there is no leakage to the outside, while at the same time the cell-case may conveniently and quickly be uncapped and the cell and absorbent material be removed for the recovery of such material as it is desirable to preserve.

What I claim is—

1. The combination with a cell-support, of a cell-case, a removable non-conducting cap carried by and closing said cell-case, supports carried by said cap, removable devices securing said supports to the cell-support, and a cell inclosed within said cell-case but free from said cap and provided with terminals extending through said cap, substantially as described.

2. The combination with a cell-support, of a cell-case, a removable non-conducting cap carried by and closing said cell-case, supporting-terminals carried by said cap, removable devices securing said supporting-terminals to the cell-support, and a cell inclosed within said cell-case but free from said cap and provided with terminals extending through said cap and connected to the said supporting-terminals outside the cap, substantially as described.

3. The combination with a cell-support, of a cell, a cell-casing inclosing said cell, a non-conducting cap closing said cell-case through which the cell-terminals pass, screw-threaded supporting-terminals carried by said cap, nuts on said supporting-terminals connecting with said cell-terminals, and removable devices securing said supporting-terminals to the cell-support, substantially as described.

4. The combination with a cell-support, of a cell, a cell-casing inclosing said cell, a non-conducting cap closing said cell-case through which the cell-terminals pass, screw-threaded supporting-terminals carried by said cap, and passing through the cell-support, nuts on said supporting-terminals connecting with said cell-terminals, and nuts on the outer ends of the supporting-terminals securing them to the cell-support, substantially as described.

5. The combination with cell-support A, of cell-case C and a cell inclosed therein, non-conducting cap 15 on said cell-case, screw-rods 16 and nuts 2 securing said cap, supporting-terminals 17 carried by said cap, and passing through the cell-support, battery-terminals 4 passing through the cap and connected to said supporting-terminals, and removable devices on the ends of the supporting-terminals 17 securing said terminals in the cell-support, substantially as described.

6. The combination with a cell-case having a cell-space larger than the cell, of a non-conducting cap 15 on said cell-case, rods 16 on said cell-case extending through said cap, nuts 2 securing said cap on said rods, and a glass cell inclosed within said cell-case and free from said cap, substantially as described.

7. The combination with a cell-case having a cell-space larger than the cell, of a non-conducting cap 15 on said cell-case, rods 16, terminals 17 carried by said cap and a glass cell inclosed within said case and free from said cap and having terminals extending through said cap and connected with the terminals 17 outside said cap, substantially as described.

8. The combination with a cell, of a cell-case having a cell-space larger than the cell, a removable non-conducting cap on said cell-case through which the terminals pass, and rubber sleeves on said terminals inside the cap, substantially as described.

9. The combination with a cell, of a cell-case having a cell-space larger than the cell, absorbent material in said space, a removable non-conducting cap on said cell-case through which the terminals pass, and rubber sleeves on said terminals inside the cap, substantially as described.

10. The combination with the cell B, of a cell-case having a cell-space larger than the cell, absorbent material in said cell-space, cap 15 closing said cell-case through which the cell-terminals pass, and rubber sleeves 6 on the terminals inside the cap, substantially as described.

11. The combination with the cell B, of the cell-case C having the screw-rods 16, cap 15 on said cell-case, nuts 2 securing said cap on said screw-rods, cell-terminals 4 passing through said cap, rigid terminals 17 carried by said cap, and nuts 3 on said rigid terminals making contact with said cell-terminals, substantially as described.

In testimony whereof I have hereunto set my hand in the presence of two subscribing witnesses.

CHARLES WILLMS.

Witnesses:
D. W. DWYER,
SAMUEL S. BOGGS.